(12) United States Patent
Yea

(10) Patent No.: US 10,051,268 B2
(45) Date of Patent: Aug. 14, 2018

(54) METHOD FOR ENCODING, DECODING VIDEO SIGNAL AND DEVICE THEREFOR

(71) Applicant: LG ELECTRONICS INC., Seoul (KR)

(72) Inventor: Sehoon Yea, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/523,424

(22) PCT Filed: Oct. 29, 2015

(86) PCT No.: PCT/KR2015/011518
§ 371 (c)(1),
(2) Date: May 1, 2017

(87) PCT Pub. No.: WO2016/068630
PCT Pub. Date: May 6, 2016

(65) Prior Publication Data
US 2017/0302921 A1    Oct. 19, 2017

Related U.S. Application Data

(60) Provisional application No. 62/072,417, filed on Oct. 29, 2014.

(51) Int. Cl.
*H04N 19/105* (2014.01)
*H04N 19/107* (2014.01)
(Continued)

(52) U.S. Cl.
CPC ......... *H04N 19/105* (2014.11); *H04N 19/103* (2014.11); *H04N 19/107* (2014.11);
(Continued)

(58) Field of Classification Search
CPC .. H04N 19/103; H04N 19/105; H04N 19/107; H04N 19/12; H04N 19/139;
(Continued)

(56) References Cited

U.S. PATENT DOCUMENTS

| 7,680,190 B2 | 3/2010 | Xu et al. |
| 2010/0118945 A1* | 5/2010 | Wada ................... H04N 19/176 375/240.12 |

(Continued)

FOREIGN PATENT DOCUMENTS

| KR | 20100097286 | 9/2010 |
| WO | 2014109826 | 7/2014 |

OTHER PUBLICATIONS

International Search Report in International Application No. PCT/KR2015/011518, dated Feb. 25, 2016, 12 pages.
(Continued)

*Primary Examiner* — Freshteh N Aghdam
(74) *Attorney, Agent, or Firm* — Fish & Richardson P.C.

(57) ABSTRACT

There is provided a method for encoding a video signal based on pixel-correlations on a transform domain, the method comprising: obtaining a first transform coefficient by transforming a pixel value of a target block in a current frame; reconstructing a second transform coefficient for a corresponding block in a previous frame; and obtaining a prediction value of the first transform coefficient based on the reconstructed second transform coefficient and a correlation coefficient.

15 Claims, 16 Drawing Sheets

(51) Int. Cl.
   *H04N 19/103* (2014.01)
   *H04N 19/44* (2014.01)
   *H04N 19/139* (2014.01)
   *H04N 19/70* (2014.01)
   *H04N 19/176* (2014.01)
   *H04N 19/51* (2014.01)
   *H04N 19/61* (2014.01)

(52) U.S. Cl.
   CPC ........... *H04N 19/139* (2014.11); *H04N 19/44* (2014.11); *H04N 19/70* (2014.11); *H04N 19/176* (2014.11); *H04N 19/51* (2014.11); *H04N 19/61* (2014.11)

(58) Field of Classification Search
   CPC ...... H04N 19/176; H04N 19/18; H04N 19/19; H04N 19/44; H04N 19/70; H04N 19/51; H04N 19/61
   See application file for complete search history.

(56) References Cited

U.S. PATENT DOCUMENTS

| | | | | |
|---|---|---|---|---|
| 2012/0201300 A1* | 8/2012 | Kim | ..................... | H04N 19/105 375/240.12 |
| 2013/0083857 A1* | 4/2013 | Zheng | .................. | H04N 19/176 375/240.18 |
| 2013/0315302 A1* | 11/2013 | Lim | ..................... | H04N 19/176 375/240.03 |
| 2014/0044166 A1 | 2/2014 | Xu et al. | | |
| 2014/0098861 A1* | 4/2014 | Yu | .......................... | H04N 19/61 375/240.12 |
| 2015/0146782 A1* | 5/2015 | Lei | ......................... | H04N 19/46 375/240.12 |
| 2015/0264352 A1* | 9/2015 | Yie | ......................... | G06T 9/004 382/233 |
| 2017/0237990 A1* | 8/2017 | Seregin | ................ | H04N 19/159 375/240.16 |
| 2017/0280142 A1* | 9/2017 | Paniconi | ................ | H04N 19/17 |
| 2018/0084249 A1* | 3/2018 | Boon | ..................... | H04N 19/11 |

OTHER PUBLICATIONS

Naftel et al., "Motion Trajectory Learning in the DFT-Coefficient Feature Space," Fourth IEEE International Conference on Computer Vision Systems, Dec. 2006, 9 pages.

* cited by examiner

Spatiotemporal
transform
code

METHOD FOR ENCODING, DECODING VIDEO SIGNAL AND DEVICE THEREFOR

CROSS-REFERENCE TO RELATED APPLICATIONS

This application is the National Stage filing under 35 U.S.C. 371 of International Application No. PCT/KR2015/011518, filed on Oct. 29, 2015, which claims the benefit of U.S. Provisional Applications No. 62/072,417, filed on Oct. 29, 2014, the contents of which are all hereby incorporated by reference herein in their entirety.

TECHNICAL FIELD

The present invention relates to a method and device for encoding/decoding a video signal. More particularly, the present invention relates to application of conditionally non-linear transform (hereinafter, referred to as 'CNT') to a spatiotemporal volume of a video signal.

BACKGROUND ART

Compression coding means a set of signal processing techniques for sending digitalized information through a communication line or storing digitalized information in a form suitable for a storage medium. Media, such as videos, images, and voice may be the subject of compression coding. In particular, a technique for performing compression coding on videos is called video compression.

Many media compression techniques are based on two types of approaches called predictive coding and transform coding. In particular, a hybrid coding technique adopts a method of combining the advantages of both predictive coding and transform coding for video coding, but each of the coding techniques has the following disadvantages.

In the case of predictive coding, any statistical dependency may not be used in obtaining predictive error samples. That is, predictive coding is based on a method of predicting signal components using parts of the same signal that have already been coded and coding the numerical difference between predicted and actual value. More specifically, predictive coding follows from information theory that prediction signals can be compressed more efficiently and may obtain a better compression effect by increasing the consistency and accuracy of prediction. Predictive coding is advantageous in processing non-smooth or non-stationary signals because it is based on causal statistics relationships, but is disadvantageous in that it is inefficient in processing signals at large scales. Furthermore, predictive coding is disadvantageous in that it may not use limitations of the human visual and auditory systems because quantization is applied to the original video signal.

Meanwhile, orthogonal transform, such as discrete cosine transform or discrete wavelet transform, may be use in transform coding. Transform coding is a technique for decomposing a signal into a set of components in order to identify the most important data. Most of the transform coefficient are 0 after quantization.

However, transform coding is disadvantageous in that it must depend on the first available data in obtaining the predictive value of samples. This makes it difficult for a prediction signal to have high quality.

Therefore, in accordance with the present invention, the compression efficiency may be improved by considering pix on the transform domain to solve the problems.

DISCLOSURE

Technical Problem

In accordance with the present invention, a method of applying a CNT to a spatio-temporal volume of a video signal is proposed.

In accordance with the present invention, a method of independently applying a CNT to each of three-dimensions of spatio-temporal volume of a video signal is proposed.

In accordance with the present invention, a method of designing a CNT for inter-frame coding is proposed.

In accordance with the present invention, a method of applying all advantages of each coding scheme based on fusion of new prediction/transform coding is proposed.

In accordance with the present invention, linear/nonlinear predictive coding, which has been combined with transform coding, is replaced with an integrated nonlinear transform block.

In accordance with the present invention, hybrid coding that has been associated with transform coding is replaced with an integrated nonlinear transform block.

In accordance with the present invention, a method for more efficiently coding a high-quality image including a non smooth or non-stationary signal is proposed.

In accordance with the present invention, a method of applying a prediction and a transform to a single dimension at the same time for coding is proposed.

In accordance with the present invention, a method of coding using nonlinear transform and vector quantization is proposed.

Technical Solution

The present invention provides a conditionally nonlinear transform (CNT) method that considers pixel-correlations on a transform domain.

In addition, the present invention provides a method of applying a CNT to a spatio-temporal volume of a video signal.

Additionally, the present invention provides a method of designing a CNT for inter-frame coding by performing prediction using a transform coefficient.

Further, the present invention provides a method for obtaining an optimal transform coefficient by considering all previously reconstructed signals when performing a prediction process.

Moreover, the present invention may utilize all reconstructed signals and a context signal to obtain an optimal transform coefficient, wherein the context signal includes at least one of a previously reconstructed signal, a previously reconstructed intra-coded signal, a previously reconstructed portion of a current frame, or information that an encoder transmits to a decoder with respect to decoding of a signal to be reconstructed.

Furthermore, the present invention may find a candidate function that minimizes the sum of the distortion measurement value and the rate measurement value to obtain an optimal transform coefficient.

Advantageous Effects

The present invention cart improve the compression efficiency by using the conditionally nonlinear transform (CNT) considering the pixel-correlations on the transform domain.

In addition, the present invention can significantly reduce the complexity while maintaining the efficiency of the conditionally nonlinear transform by converting the original optimization problem for the spatiotemporal volume of the pixels in the video signal into a one-dimensional temporal trajectory.

Further, the present invention can combine predictive coding and transform coding to take all the advantages of each coding scheme. In other words, by using all of the previously reconstructed signals, more precise and improved prediction can be performed, and the statistical dependency of the prediction error sample can be utilized.

Moreover, by applying the prediction and the transform at the same time to the single dimension for coding enables more efficient coding for a high-quality image including the non-smooth or non-stationary signal.

In addition, the prediction error included in the prediction error vector may be controlled by allowing each decoded transform coefficient to affect the entire reconstruction process. That is, the quantization error propagation problem is solved because the quantization error is controlled.

According to the present invention, it is possible to perform signal adaptive decoding without additional information. Compared to a conventional hybrid coder, high-quality prediction is possible, and prediction error is reduced in accordance with the present invention.

Further, the present invention may provide a more advanced spatiotemporal video compression method, so that efficient coding is enabled even for an image in which the motion dependency is significant or the spatial boundary characteristic is prominent.

BEST MODES

Figure 1:
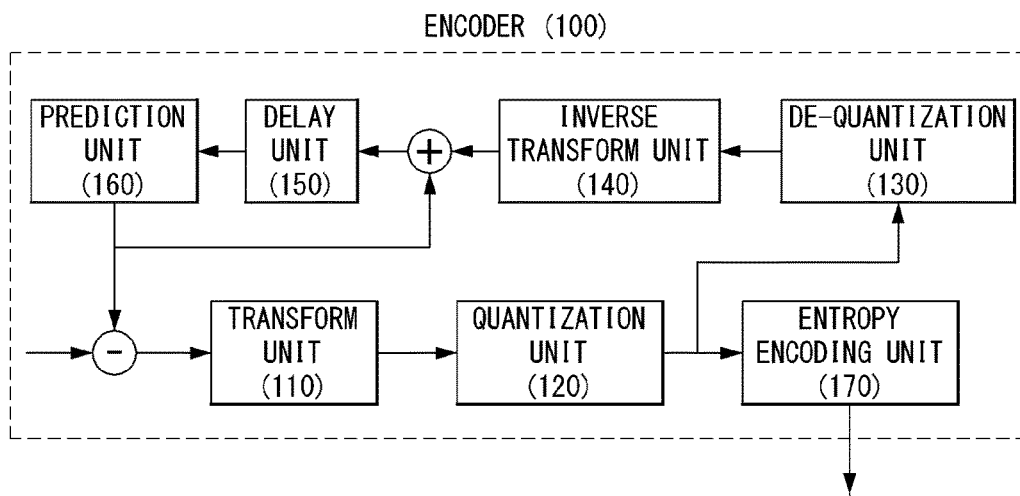
FIGS. 1 and 2 illustrate schematic block diagrams of an encoder and a decoder in which media coding is performed.

In accordance with a first aspect of the present invention, there is provided a method for encoding a video signal based on pixel-correlations on a transform domain, the method comprising: obtaining a first transform coefficient by transforming a pixel value of a target block in a current frame; reconstructing a second transform coefficient for corresponding block in a previous frame; and obtaining a prediction value of the first transform coefficient based on the reconstructed second transform coefficient and a correlation coefficient.

In one implementation of the first aspect, the second transform coefficient is reconstructed based on all previously reconstructed transform coefficients and the first transform coefficient.

In one implementation of the first aspect, the correlation coefficient indicates a correlation between the reconstructed second transform coefficient and the first transform coefficient.

In one implementation of the first aspect, the correlation coefficient varies based on a frequency index of the transform coefficients.

In one implementation of the first aspect, the method further comprises obtaining an optimal transform coefficient using an optimal function, wherein the optimal function is based on the first transform coefficient and the second transform coefficient, wherein the optimal transform coefficient represents a minimum value of the optimal function.

In one implementation of the first aspect, the corresponding block in the previous frame corresponds to a block corresponding to the target block in the current frame.

In accordance with a second aspect of the present invention, there is provided a method for decoding a video signal, the method comprising receiving video signal including a first transform coefficient for a target block in a current frame; obtaining a spatial transform coefficient by performing a temporal inverse transform on the first transform coefficient, wherein the temporal inverse transform represents an inverse transform applied based on a temporal trajectory; reconstructing the spatial transform coefficient by using a second transform coefficient for a corresponding block in a previous frame; and reconstructing the video signal by performing a spatial inverse transform on the spatial transform coefficient.

In one implementation of the second aspect, the first transform coefficient represents a spatiotemporal transform coefficient obtained based on an optimal function.

In accordance with a third aspect of the present invention, there is provided a device for encoding a video signal based on pixel-correlations on a transform domain, the device comprising: spatial transform unit configured to obtain a first transform coefficient by transforming a pixel value of a target block in a current frame; and an optimization unit configured to reconstruct a second transform coefficient for a corresponding block in a previous frame, and obtain a prediction value of the first transform coefficient based on the reconstructed second transform coefficient and a correlation coefficient.

In accordance with a third aspect of the present invention, the correlation coefficient indicates a correlation between the reconstructed second transform coefficient and the first transform coefficient.

In accordance with a third aspect of the present invention, the correlation coefficient varies based on a frequency index of the transform coefficients.

In accordance with third aspect of the present invention, the optimization unit is further configured to obtain an optimal transform coefficient using an optimal function, wherein the optimal function is based on the first transform coefficient and the second transform coefficient, wherein the optimal transform coefficient represents a minimum value of the optimal function.

In accordance with a third aspect of the present invention, the corresponding block in the previous frame corresponds to a block corresponding to the target block in the current frame.

In accordance with a fourth aspect of the present invention, there is provided a device for decoding a video signal, the device comprising: an entropy-decoding unit configured to receive a video signal including a first transform coefficient for a target block in a current frame; and an inverse-transform unit configured to obtain a spatial transform coefficient by performing a temporal inverse transform on the first transform coefficient, reconstruct the spatial transform coefficient by using a second transform coefficient for a corresponding block in a previous frame, and reconstruct the video signal by performing a spatial inverse transform on the spatial transform coefficient, wherein the temporal inverse transform represents an inverse transform applied based on a temporal trajectory.

In one implementation of the fourth aspect, the first transform coefficient represents a spatiotemporal transform coefficient obtained based on an optimal function.

Hereinafter, exemplary elements and operations in accordance with embodiments of the present invention are described with reference to the accompanying drawings. It is however to be noted that the elements and operations of the present invention described with reference to the drawings are provided as only embodiments and the technical spirit and kernel configuration and operation of the present invention are not limited thereto.

Furthermore, terms used in this specification are common. terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process.

Further, the concepts and methods of the embodiments described herein are applicable to other embodiments, and combinations of the embodiments may be applied within the technical scope of the present invention even if not explicitly described herein.

Figure 2:
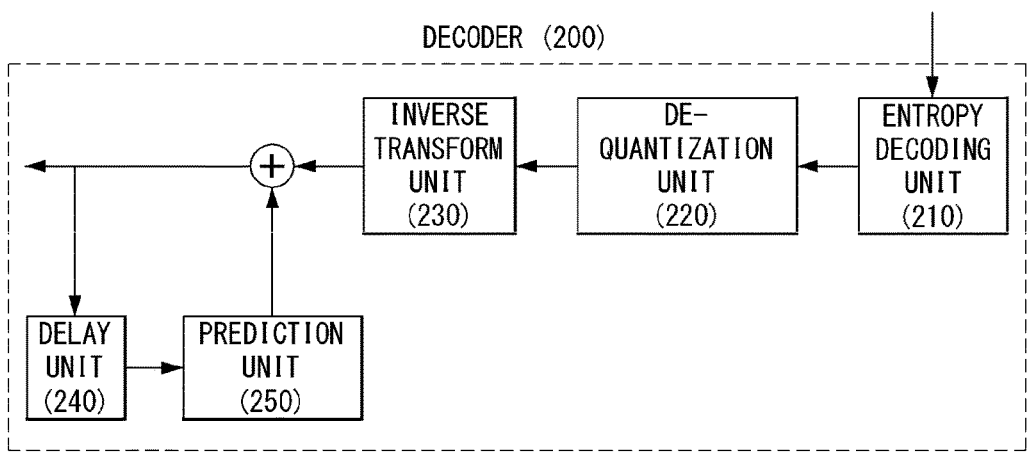

FIGS. 1 and 2 illustrate schematic block diagrams of an encoder and a decoder in which media coding is performed.

The encoder 100 of FIG. 1 includes a transform unit 110, a quantization unit 120, a de-quantization unit 130, an inverse transform unit 140, a delay unit 150, a prediction unit 160, and an entropy encoding unit 170. The decoder 200 of FIG. 2 includes an entropy decoding unit 210, a de-quantization unit 220, an inverse transform unit 230, a delay unit 240, and a prediction unit 250.

The encoder 100 receives the original video signal and generates a prediction error by subtracting a prediction signal, output by the prediction unit 160, from the original video signal. The generated prediction error is transmitted to the transform unit 110. The transform unit 110 generates a transform coefficient by applying a transform scheme to the prediction error.

The transform scheme may include, for example, a block-based transform method and an image-based transform method. The block-based transform method may include, for example, Discrete Cosine Transform DCT and Karhuhen-Loeve Transform. The DCT means that a signal on a space domain is decomposed into two-dimensional frequency components. A pattern having lower frequency components toward an upper left corner within a block and higher frequency components toward a lower right corner within the block is formed. For example, only one of 64 two-dimensional frequency components that is placed at the top left corner may be a Direct Current DC component and may have a frequency of 0. The remaining frequency components may be Alternate Current AC components and may include 63 frequency components from the lowest frequency component to higher frequency components. To perform the DCT includes calculating the size of each of base components e.g., 64 basic pattern components included in a block of the original video signal, the size of the base component is a discrete cosine transform coefficient.

Furthermore, the DCT is transform used for a simple expression into the original video signal components. The original video signal is fully reconstructed from frequency components upon inverse transform. That is, only a method of representing video is changed, and all the pieces of information included in the original video in addition to redundant information are preserved. If DCT is performed on the original video signal, DCT coefficients are crowded at a value close to 0 unlike in the amplitude distribution of the original video signal. Accordingly, a high compression effect can be obtained using the DCT coefficients.

The quantization unit 120 quantizes a transform coefficient and sends the quantized coefficient to the entropy encoding unit 170. The entropy encoding unit 170 performs entropy coding on the quantized signal and outputs an entropy-coded signal.

The quantized signal output by the quantization unit 120 may be used to generate a prediction signal. For example, the de-quantization unit 130 and the inverse transform unit 140 within the loop of the encoder 100 may perform de-quantization and inverse transform on the quantized signal so that the quantized signal is reconstructed into a prediction error. A reconstructed signal may be generated by adding the reconstructed prediction error to a prediction signal output by the prediction unit 160.

The delay unit 150 stores the reconstructed signal for the future reference of the prediction unit 160. The prediction unit 160 generates a prediction signal using a previously reconstructed signal stored in the delay unit 150.

The decoder 200 of FIG. 2 receives a signal output by the encoder 100 of FIG. 1. The entropy decoding unit 210 performs entropy decoding on the received signal. The de-quantization unit 220 obtains a transform coefficient from the entropy-decoded signal based on information about a quantization step size. The inverse transform unit 230 obtains a prediction error by performing inverse transform on the transform coefficient. A reconstructed signal is generated by adding the obtained prediction error to a prediction signal output by the prediction unit 250.

The delay unit 240 stores the reconstructed signal for the future reference of the prediction unit 250. The prediction unit 250 generates a prediction signal using a previously reconstructed signal stored in the delay unit 240.

Predictive coding, transform coding, and hybrid coding may be applied to the encoder 100 of FIG. 1 and the decoder 200 of FIG. 2. A combination of all the advantages of predictive coding and transform coding is called hybrid coding.

Predictive coding may be applied to individual samples every time, and in fact the most powerful method for prediction is to have cyclic structure. This cyclic structure based on the fact that best prediction available when using the closest value. That is, the best prediction may be performed when a prediction value is coded and this coded value is used immediately to predict other values.

By the way, a problem when such an approach is used in hybrid coding is that prediction residuals need to be grouped prior to transform. In such case, the prediction of the cyclic structure may lead to an increase of accumulated errors because a signal may not be precisely reconstructed.

In existing hybrid coding, prediction and transform are separated in two orthogonal dimensions. For example, in the case of video coding, prediction is adopted in a time domain and transform is adopted in a space domain. Furthermore, in existing hybrid coding, prediction is performed from only data within a previously coded block. Although this may eliminate error propagation, it has the disadvantage of forcing data to have a smaller statistical correlation with some data samples in the block to be employed for the prediction process, thereby reducing performance.

Accordingly, an embodiment of the present invention is intended to solve such problems by removing constraints on data that may be used in a prediction process and enabling a new hybrid coding form in which the advantages of predictive coding and transform coding are integrated.

Furthermore, the present invention intends to improve compression efficiency by providing a conditionally nonlinear transform method that considers pixel-correlations in a transform domain.

Figure 3:
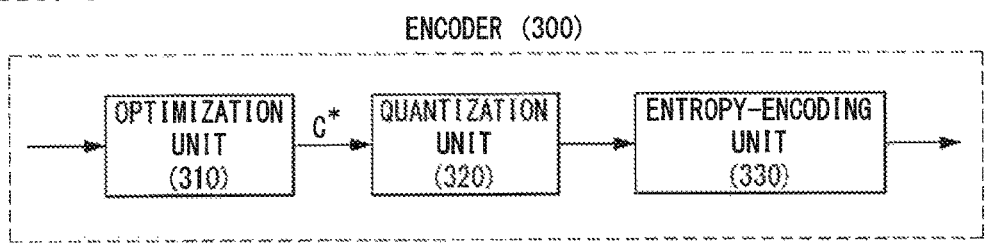
FIGS. 3 and 4 are schematic block diagrams illustrating an encoder and a decoder to which an advanced coding method may be applied in accordance with embodiments to which the present invention is applied.
Figure 4:
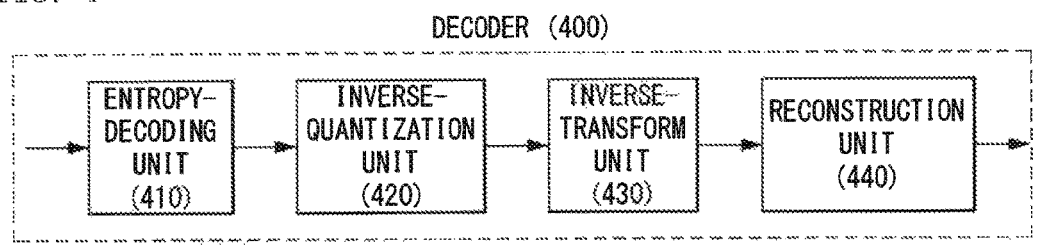

FIGS. 3 and 4 are schematic block diagrams illustrating an encoder and a decoder to which an advanced coding method may be applied in accordance with embodiments to which the present invention is applied.

In order to obtain transform coefficients for N data in an existing coded, N residual data or prediction error resulting from subtracting N prediction data from N original data at once is subjected to transform coding. In this case, the prediction process and the conversion process are sequentially performed.

However, when prediction is performed using most recently reconstructed data on a pixel basis with respect to image data composed of N pixels, the most accurate prediction result may be obtained. For this reason, it is not an optimal coding scheme to sequentially apply prediction and conversion on N pixels basis.

On the other hand, in order to obtain the most recently reconstructed data on a pixel-by-pixel basis, inverse transform is performed on the already obtained transform coefficients to reconstruct the residual data, which then is added to predicted data. However, in the conventional coding method, since transform coefficients can be obtained by applying the transform only after the prediction on N data is completed, it is impossible to reconstruct data on a pixel-by-pixel basis.

Accordingly, the present invention proposes a method of obtaining a transform coefficient using previously reconstructed signal and a context signal.

The encoder 300 in FIG. 3 includes an optimization unit 310, a quantization unit 320 and an entropy-encoding unit 330. The decoder 400 in FIG. 4 includes an entropy-decoding unit 410, an inverse-quantization unit 420, an inverse-transform unit 430, and a reconstruction unit 440.

Referring to the encoder 300 in FIG. 3, the optimization unit 310 obtains an optimized transform coefficient. The optimization unit 310 may apply following embodiments to obtain the optimized transform coefficient.

First, in order to explain an embodiment to which the present invention is applied, a reconstruction function for reconstruct a signal may be defined as follows:

$$\tilde{x} = R(c, y) \qquad \text{[equation 1]}$$

where, $\tilde{x}$ denotes a reconstructed signal, c denotes a decoded transform coefficient, and y denotes a context signal. $R(c, y)$ represents a nonlinear reconstruction function using c and y to produce the reconstructed signal.

In one embodiment of the present invention, the applicants propose a method to generate an advanced non-linear predictor to obtain the optimized transform coefficient In the present embodiment, the prediction signal may be defined as a relationship between the transform coefficient and the previously reconstructed values. That is, the encoder and decoder to which the present invention is applied may generate an optimized prediction signal considering all the previously reconstructed signals for the prediction process. In addition, the non-linear prediction function may be applied as a prediction function to generate the prediction signal. Thus, each decoded transform coefficient affects the entire reconstruction process and enables control of prediction error contained in a prediction error vector.

For example, the prediction error signal may be defined as follows:

$$e = Tc \qquad \text{[equation 2]}$$

where e represents a prediction error signal, c represents a decoded transform coefficient, and T represents a transformation matrix.

In this case, the reconstructed signal may be defined as follows:

$$\tilde{x}_1 = R_1(e_1, y) \qquad \text{[equation 3]}$$
$$\tilde{x}_2 = R_2 e_2, y, \tilde{x}_1$$
$$\vdots$$
$$\tilde{x}_n = R_n(e_n, y, \tilde{x}_1, \tilde{x}_2, \ldots, \tilde{x}_{n-1})$$

where $\tilde{x}_n$ denotes an n-th reconstructed signal, $e_n$ denotes an n-th prediction error signal, and y denotes a context signal. $R_n$ represents a nonlinear reconstruction function using $e_n$ and y to generate the reconstructed signal.

For example, the nonlinear restoration function $R_n$ may be defined as follows:

$$R_1(e_1, y) = P_1(y) + e_1 \quad \text{[equation 4]}$$
$$R_2(e_2, y, \tilde{x}_1) = P_2(y, \tilde{x}_1) + e_2$$
$$\vdots$$
$$R_n(e_n, y, \tilde{x}_1, \ldots, \tilde{x}_{n-1}) = P_n(y, \tilde{x}_1, \tilde{x}_2 \ldots, \tilde{x}_{n-1}) + e_n$$

where $P_n$ represents the non-linear prediction function composed of the variables to generate the prediction signal.

The non-linear prediction function may be, for example, a median function or a combination of rank order filters or nonlinear functions or combinations of linear functions.

Further, the non-linear prediction functions $P_n$ may be different nonlinear functions.

In another embodiment, the encoder 300 and decoder 400 to which the present invention is applied may include a storage of candidate non-linear prediction functions for selecting the non-linear prediction functions.

For example, the optimization unit 310 may select an optimal nonlinear prediction function to produce the optimized transform coefficient. In this case, the optimal nonlinear prediction function may be selected from the candidate functions stored in the storage. This may be described in more detail with reference to FIG. 7 and FIG. 8.

In this way, by selecting the optimal nonlinear prediction function, the optimization unit 310 may generate the optimized transform coefficient.

Meanwhile, the output transform coefficient is transmitted to the quantization unit 320, and the quantization unit 320 quantizes the transform coefficient and transmits the quantized coefficient to the entropy-encoding unit 330.

The entropy-encoding unit 330 entropy-encodes the quantized transform coefficient to output compressed bitstream.

The decoder 400 in FIG. 4 receives the compressed bitstream from the encoder in FIG. 3. Then, entropy decoding is performed on the compressed bitstream via the entropy-decoding unit 410. Then, inverse quantization is performed on the entropy-decoded bitstream via the inverse-quantization unit 420. In this case, the signal output from the inverse-quantization unit 420 may mean the optimized transform coefficient.

The inverse-transform unit 430 receive; the optimized transform coefficient and then performs inverse transform process on the optimized transform coefficient. Further, the inverse-transform unit 430 generates the prediction error signal via the inverse transform process.

The reconstruction unit 440 generates the reconstructed signal by summing the prediction error signal and the prediction signal. In this case, in the case of the prediction signal, various embodiments as described above with reference to FIG. 3 may be applied.

Figure 5:
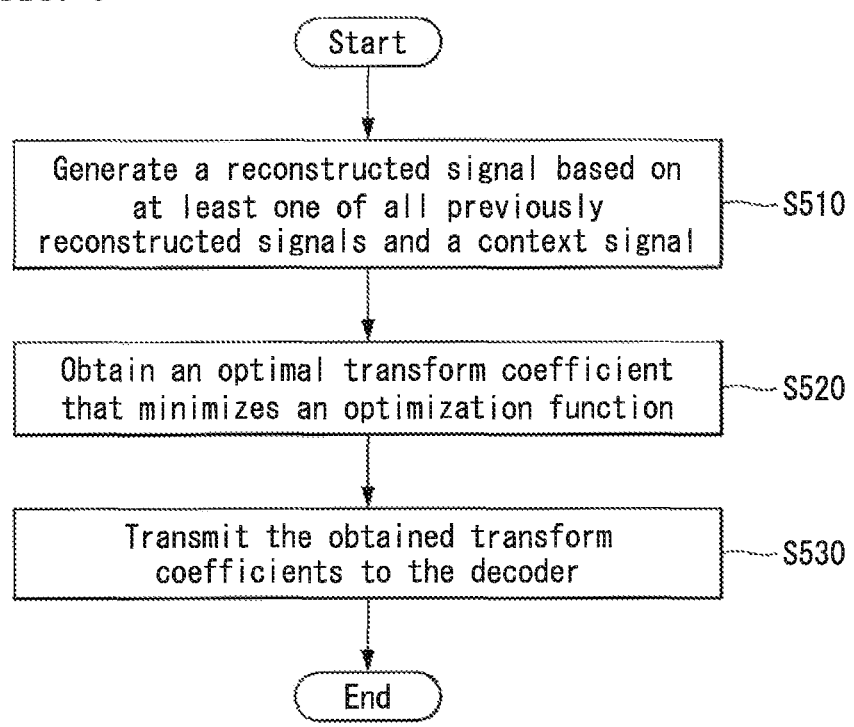
FIG. 5 is a schematic flowchart illustrating an advanced, video coding method in accordance with an embodiment to which the present invention is applied.

FIG. 5 is a schematic flowchart illustrating an advanced video coding method in accordance with an embodiment to which the present invention is applied.

The encoder may generate a reconstructed signal based on at least one of all previously reconstructed signals and a context signal S510. In this case, the context signal may include at least one of a previously reconstructed signal, a previously reconstructed intra-coded signal, a previously reconstructed portion of a current frame, or other information related to decoding of a signal to be reconstructed. The reconstructed signal may be made of a sum of a prediction signal and a prediction error signal. Each of the prediction signal and the prediction error signal may be generated based on at least one of a previously reconstructed signal and a context signal.

The encoder may obtain an optimal transform coefficient that minimizes an optimization function S520. In this case, the optimization function may include a distortion component, a rate component, and a Lagrange multiplier $\lambda$. The distortion component may be composed of a difference between an original video signal and the reconstructed signal. The rate component may include a previously-obtained transform coefficient. $\lambda$ represents a real number that maintains a balance between the distortion component and the rate component.

The obtained transform coefficients are transmitted to the decoder via quantization and entropy encoding S530.

On the other hand, the decoder receives the transmitted transform coefficient, and obtains a prediction error vector via entropy decoding, inverse quantization, and inverse transform. The prediction unit in the decoder generates a prediction signal using all of available samples that are already reconstructed. The prediction unit reconstructs a video signal based on the prediction signal and the reconstructed prediction error vector. In this case, the process of generating the prediction signal may be applied as in the embodiments described above with reference the encoder.

Figure 6:
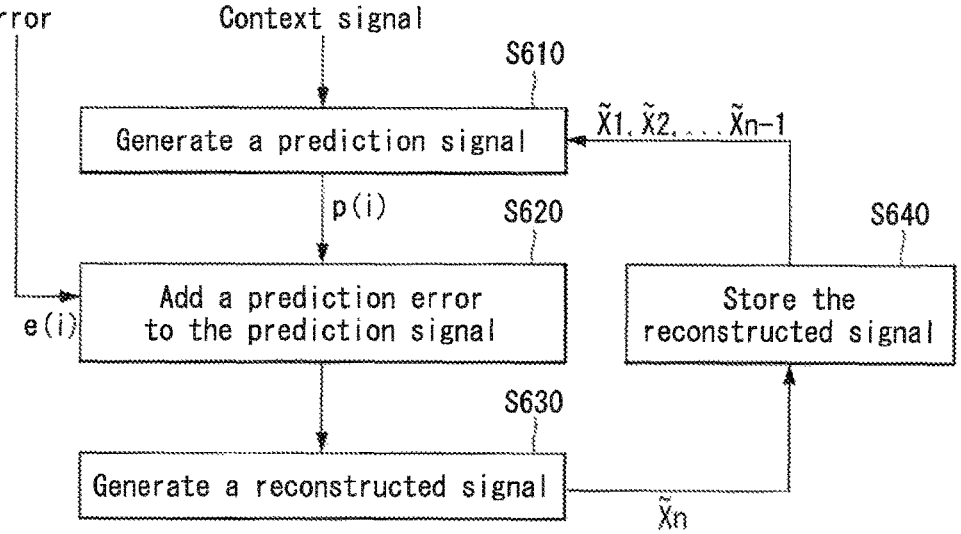
FIG. 6 is a flowchart illustrating an advanced video coding method for generating an optimized prediction signal in accordance with an embodiment to which the present invention is applied.

FIG. 6 is a flowchart illustrating an advanced video coding method for generating an optimized prediction signed in accordance with an embodiment to which the present invention is applied.

In this method, a prediction signal may be generated using previously reconstructed signals $\tilde{x}_1, \tilde{x}_2, \ldots, \tilde{x}_{n-1}$ and a context signal S610. For example, the previously reconstructed signal may represent the previously reconstructed signals $\tilde{x}_1, \tilde{x}_2, \ldots, \tilde{x}_{n-1}$ as defined in the above equation 3. in order to generate the prediction signal, a nonlinear prediction function may be applied. Different nonlinear prediction functions may be adaptively applied to the prediction signals.

The prediction signal is added to a received prediction error signal e(i) S620 to generate a reconstructed signal S630. In this case, the operation S620 may be performed using an adder (not shown).

The generated reconstructed signal $\tilde{x}_n$ may be stored for future reference S640. This stored signal may then be used to generate the next prediction signal.

In this way, by removing limitations on the available data for the process of generating the prediction signal, that is, by generating the prediction signal using all signals already reconstructed, may be possible to provide an improved compression efficiency.

Hereinafter, the process of generating the prediction signal in the operation S610 will be described in more detail.

Figure 7:
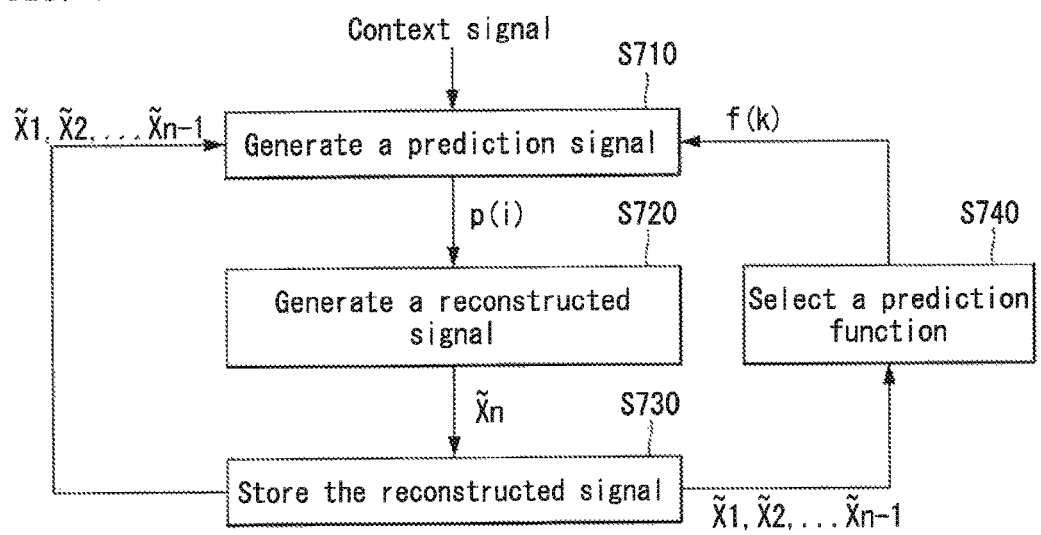
FIG. 7 is a flowchart illustrating a process of generating an optimized prediction signal in accordance with an embodiment to which the present invention is applied.

FIG. 7 is a flowchart illustrating a process of generating an optimized prediction signal in accordance with an embodiment to which the present invention is applied.

As described above with reference to FIG. 6, a prediction signal p(i) may be generated using previously reconstructed signals $\tilde{x}_1, \tilde{x}_2, \ldots, \tilde{x}_{n-1}$ and a context signal S710. In this case, it may be necessary to select an optimal prediction function f (k) to generate the prediction signal.

The reconstructed signal $\tilde{x}_n$ may be generated using the generated prediction signal S720. The generated reconstructed signal $\tilde{x}_n$ may be stored for future reference S730.

Therefore, all previously reconstructed signals $\tilde{x}_1, \tilde{x}_2, \ldots, \tilde{x}_{n-1}$ and a context signal may be used to select the optimal prediction function. For example, the optimal prediction function may be selected by finding out a candidate function that minimizes the sum of the distortion measurement and the rate measurement values S740.

In this case, the distortion measurement value represents a measurement of the distortion between the original image signal and the reconstructed signal, and the rate measurement value represents a measurement of a rate required to transmit or store the transform coefficient.

More specifically, in accordance with the present invention, the optimal prediction function may be obtained by selecting a candidate function that minimizes a following equation 5:

$$c^* = \underset{c_1 \in \Omega_1, \ldots, c_n \in \Omega_n}{\mathrm{argmin}} \{D(x, \tilde{x}c) + \lambda Rc\} \quad \text{[equation 5]}$$

where c* represents a c value that minimizes the equation 5, that is, a decoded transform coefficient. Further, $D(x,\tilde{x}(c))$ represents the distortion measurement value between. the original image signal and its reconstructed signal. R(c) represents a measurement value of a rate required to transmit or store the transform coefficient c.

For example, $D(x,\tilde{x}(c)) = \|x-\tilde{x}(c)\|_q$ (q=0, 0.1, 1, 1.2, 2, 2.74, 7, etc.). R (c) may represent the number of hits used to store the transform coefficient c using an entropy coder such as a Huffman coder or an arithmetic coder. Alternatively, R (c) may indicate the number of bits predicted using an analytical rate model such as a Laplacian. or Gaussian probability model, $R(c) = \|x-\tilde{x}(c)\|\tau(\tau=0, 0.4, 1, 2, 2.2, \text{etc.})$.

On the other hand, λ represents a Lagrange multiplier used in the encoder optimization. For example, λ may represent a real number that maintains a balance between the distortion measurement and the rate measurement.

Figure 8:
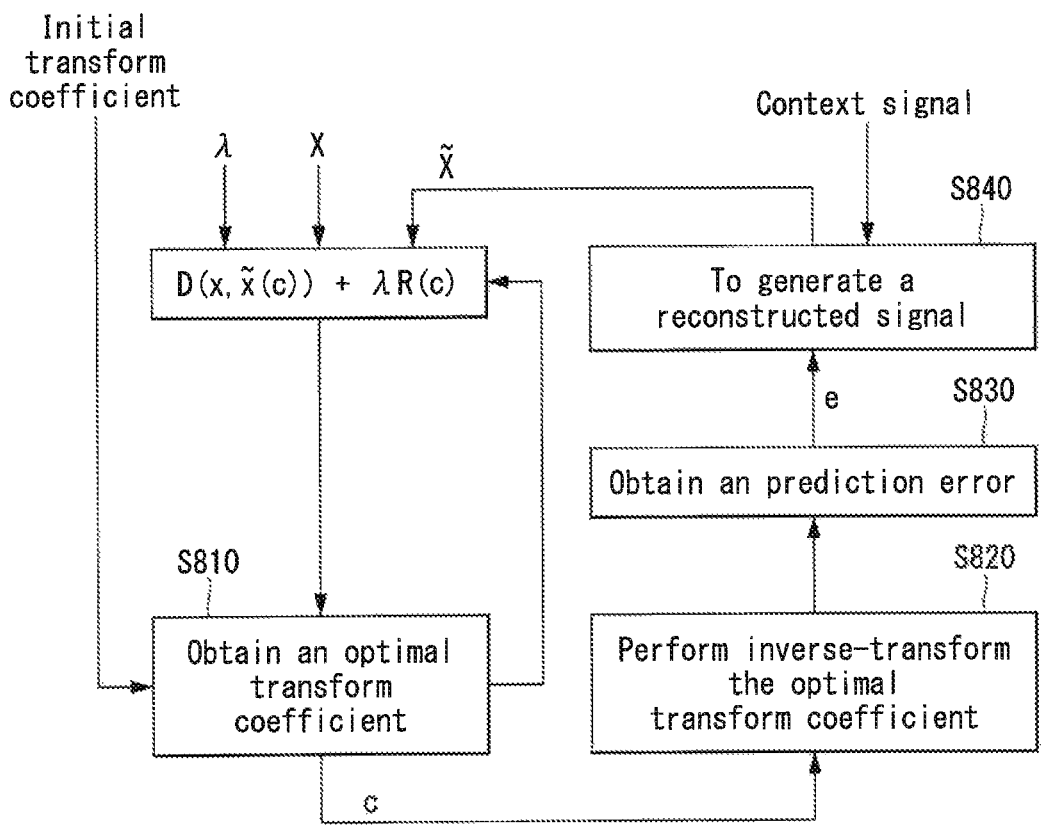
FIG. 8 is a flowchart illustrating a method of obtaining an optimized transform coefficient in accordance with an embodiment to which the present invention is applied.

FIG. 8 is a flowchart illustrating a method of obtaining an optimized transform coefficient in accordance with an embodiment to which the present invention is applied.

The present invention may provide an advanced coding method by obtaining an optimal transform coefficient that minimizes the sum of the distortion measurement and the rate measurement.

First, the encoder may obtain an optimal. transform coefficient that minimizes the sum of the distortion measurement and rate measurement S810. For example, the equation 5 may be applied for the sum of the distortion measurement and the rate measurement. In this case, at least one of an original signal x, a previously reconstructed signal $\tilde{x}$, a previously obtained transform coefficient, and a Lagrange multiplier λ may be used as an input signal. In this case, the previously reconstructed signal may be obtained based on the previously obtained transform coefficient.

The optimal transform coefficient c is inversely transformed via an inverse transform process S820, to obtain a prediction error signal S830.

The encoder generates the reconstructed signal $\tilde{x}$ using the obtained error signal S840. In this case, the context signal may be used to generate the reconstructed signal $\tilde{x}$.

The resulting reconstructed signal may then be used to obtain the optimal transform coefficient that minimizes the sum of the distortion and rate measurements.

As such, the optimal transform coefficient may updated and be used to obtain a new optimized transform coefficient again via the reconstruction process.

This process may be performed in the optimization unit 310 in the encoder 300. The optimization unit 310 outputs the newly obtained transform coefficient, and the output transform coefficient is compressed and transmitted via a quantization and entropy encoding process.

In one embodiment of the present invention, the prediction signal is used to obtain the optimal transform coefficient, and the prediction signal may be defined as the relationship between the transformed coefficient and previously reconstructed signals. In this case, the transform coefficient may be explained using the equation 2. As in the equations 2 and 3, each transform coefficient may affect the overall reconstruction process and enable the wider control of the prediction error contained in the prediction error vector.

In one embodiment of the present invention, the reconstruction process may be limited to being linear. In such a case, the reconstructed signal may be defined as a following equation 6:

$$\tilde{x} = F\,T\,c + H\,y \quad \text{[equation 6]}$$

where $\tilde{x}$ denotes the reconstructed signal, c denotes the decoded transform coefficient, and y denotes the context signal. Further, each of F, T, and H denotes an n×n matrix.

In one embodiment of the present invention, an n×n. matrix S may be used to control the quantization error included in the transform coefficient. In this case, the reconstructed signal may be defined as follows:

$$\tilde{x} = F\,S\,T\,c + H\,y \quad \text{[equation 7]}$$

The matrix S for controlling the quantization error may be obtained using a following minimization procedure expressed as a following equation 8:

$$\min_{S} \left\{ \sum_{x \in T} \min_{c_1 \in \Omega_1, \ldots, c_n \in \Omega_n} \{D(x, \tilde{x}(c)) + \lambda R(c)\} \right\} \quad \text{[equation 8]}$$

where T represents a training signal, and the transform coefficients c are ordered in a n-dimensional vector. The transform coefficient components satisfy $C_i \in \Omega_i$. In this case, $\Omega_i$ denotes series of discrete values, and is generally determined via an inverse quantization process with an integer value being applied. For example, $\Omega_i = \{-3\Delta i, -2\Delta i, -1\Delta i, 0\Delta i, 2\Delta i, 3\Delta i, \ldots\}$, where Δi represents an constant quantization step size. Further, the transform coefficients may have different quantization step sizes.

In one embodiment of the present invention, the n×n matrixes F, S, H in the equation 7 may be jointly optimized for the training signal, The joint optimization method may be performed by minimizing an equation 9 below:

$$\min_{F,H} \left\{ \sum_{\lambda \in \Lambda} \left\{ \min_{S_\lambda} \left\{ \sum_{x \in T} \min_{c_1 \in \Omega_1, \ldots, c_n \in \Omega_n} \{D(x, \tilde{x}(c)) + \lambda R(c)\} \right\} \right\} \right\} \quad \text{[equation 9]}$$

where, $\Lambda = \{\lambda_1, \lambda_2, \ldots, \lambda_L\}$ denotes a target set of constraint multipliers. L is an integer. The reconstruction function at λ may be defined as a following equation:

$$\tilde{x}_\lambda = F\,S_\lambda T\,c + Hy. \quad \text{[equation 10]}$$

Figure 9:
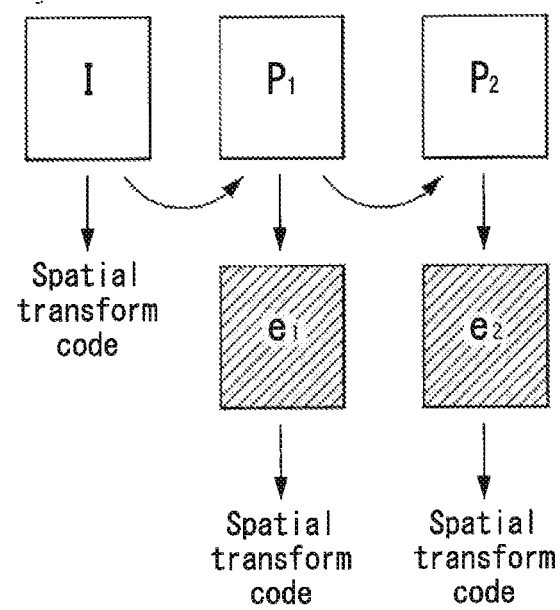
FIG. 9 and FIG. 10 are conceptual diagrams for explaining a method of applying a spatiotemporal transform to a group of pictures (GOP) according to embodiments of the present invention.
Figure 10:
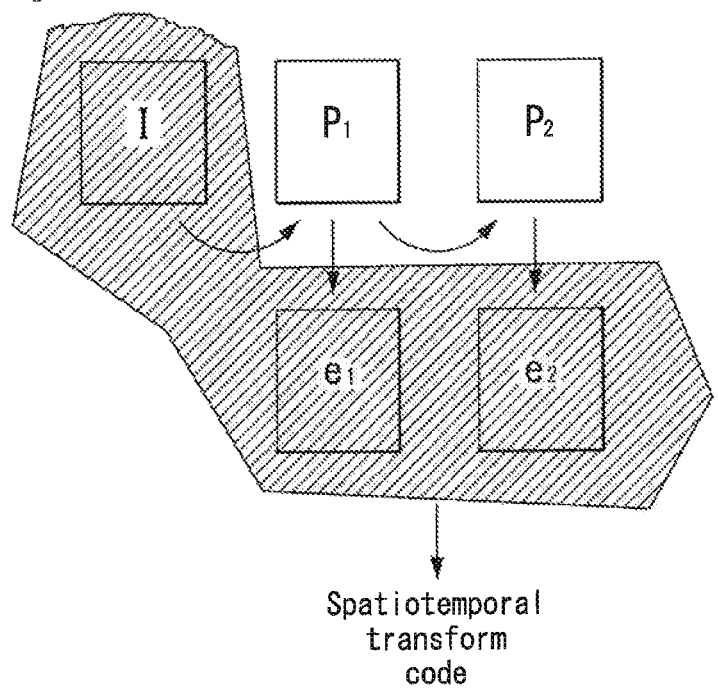

FIG. 9 and FIG. 10 are conceptual diagrams for explaining a method of applying a spatiotemporal transform to a group of pictures (GOP) according to embodiments of the present invention.

In accordance with the present invention, the spatiotemporal transformation may be applied to the including V frames. In this case, the prediction error signal and the reconstructed signal may be defined as follows:

$$e = T_{st}c \qquad \text{[equation 11]}$$

$$\begin{aligned} R_1(e_1, y) &= P_1(y) + e_1 \\ R_2(e_2, y, \tilde{x}_1) &= P_2(y, \tilde{x}_1) + e_2 \\ &\vdots \\ R_n(e_n, y, \tilde{x}_1, \ldots, \tilde{x}_{n-1}) &= P_n(y, \tilde{x}_1, \tilde{x}_2 \ldots, \tilde{x}_{n-1}) + e_n \end{aligned} \qquad \text{[equation 12]}$$

where $T_{st}$ denotes a spatiotemporal transform matrix, and c denotes decoded transform coefficients for an entire group of the pictures.

Further, e (i) represents an error vector formed of error values corresponding to the frames respectively. For example, in the case of an error for a group of pictures with V frames, $$e = \begin{bmatrix} e^1 \\ \vdots \\ e^V \end{bmatrix}.$$

In this case, the error vector e may include all the error values for the entire GOP having the V frames.

Furthermore, $\tilde{x}_n$ represent an n-th reconstructed signal, and y represents the context signal. $R_n$ denotes a nonlinear reconstruction function using $e_n$ and y to generate the reconstructed signal. $P_n$ denotes a non-linear prediction function for generating the prediction signal.

FIG. 9 is a diagram for explaining a transform method in a general spatial domain. FIG. 10 is a diagram for explaining a method of applying a spatiotemporal transform to the group of pictures.

Referring to FIG. 9, it may be seen that, in the existing coding scheme, the transform codes in the spatial domain are independently generated with respect to the error values of I frame and P frame.

On the contrary, referring to FIG. 10 in accordance with the present invention, the coding efficiency may be further improved by jointly applying a joint spatiotemporal transform to the error values of I frame and P frame. That is, as confirmed in the equation 12, when the reconstructed signal is generated, a joint spatiotemporal transformed error vector is used in a cyclic structure. Thus, a high definition image containing a non-smooth and non stationary signal may be more efficiently coded.

Spatiotemporal Extension of Conditionally Nonlinear Transform (CNT) for Inter-frame Coding The present invention provides a new method of improving efficiency of a compression algorithm using a CNT technique that considers pixel-correlations in the transform domain. The CNT combines transform and prediction operations with each other in an optimal way by considering the quantization. effect of samples. The present invention may combine a completely arbitrary prediction method with an arbitrary transform, with taking into account a propagation effect of quantization errors. High compression efficiency may be achieved by selecting and applying different design parameters based on different types of conventional prediction-transform scenarios such infra and inter predictions. In this case, the selection of different design parameters may include selection of geometric structures of neighboring pixel sets considered in each CNT operation.

The present invention provides a method for designing the CNT for inter-frame coding of the video signal. In accordance with the present invention, original optimization problem for a spatiotemporal volume of pixels in the video signal may be converted into a one-dimensional temporal trajectory. By doing so, the complexity may be significantly reduced while maintaining the efficiency of the CNT technology.

The present invention provides a CNT technique for a spatiotemporal volume of the video signal. For example, the CNT may be independently applied to each of three dimensions of the spatiotemporal video volume.

In accordance with the present invention, first, a spatial transform such as DCT may be applied to each coding unit (CU or PU) in a frame to obtain spatially de-correlated corresponding transform coefficients. The CNT may be designed using the transform coefficients along a one-dimensional temporal motion trajectory resulting from inter-frame motion. estimation. Thus, the problem of designing the CNT for inter-frame coding, which requires processing of the 3D spatiotemporal pixel volume, may be reformulated into a one-dimensional CNT design problem. Thus, the present invention proposes a method for designing the CNT for inter-frame coding without incurring high computational complexity. In this way, long-term temporal correlation may be effectively considered within the CNT framework.

Another embodiment of the present invention relates to a method of generating a special form of a CNT applied to a group of video frames (or a GOP).

First, temporal matching blocks are located in a given GOP (group of pictures) to form a temporal trajectory.

Second, the spatial Transform or 'S-transform' such as DCT is applied to each CU in the frame, so that the transform coefficients of the CU are de-correlated. A first matching operation may be performed in the pixel domain as in the conventional codec, or may be performed on a transform coefficient domain resulting from the spatial transform.

Third, the CNT parameters are designed for the coding coefficients of the same frequency in the CU along the temporal trajectory. In this case, the CNT parameters may mean F and H matrices in the above equation 6. Temporal prediction dependencies such as IPPP or IBBBP may be considered when deriving the CNT parameters.

At the above operation, various forms of one-dimensional predictors may be devised for improved performance. For example, a correlation coefficient between transform coefficient values between the temporally corresponding blocks may vary based on the frequency index or time of the correlation coefficients.

Herein, the spatial transform or S-transform represents a spatial transform for calculating a transform coefficient for each frame as in a following equation 15. The temporal transform or 'T-transform' represents a temporal transform required for CNT operation along the temporal trajectory.

Figure 11:
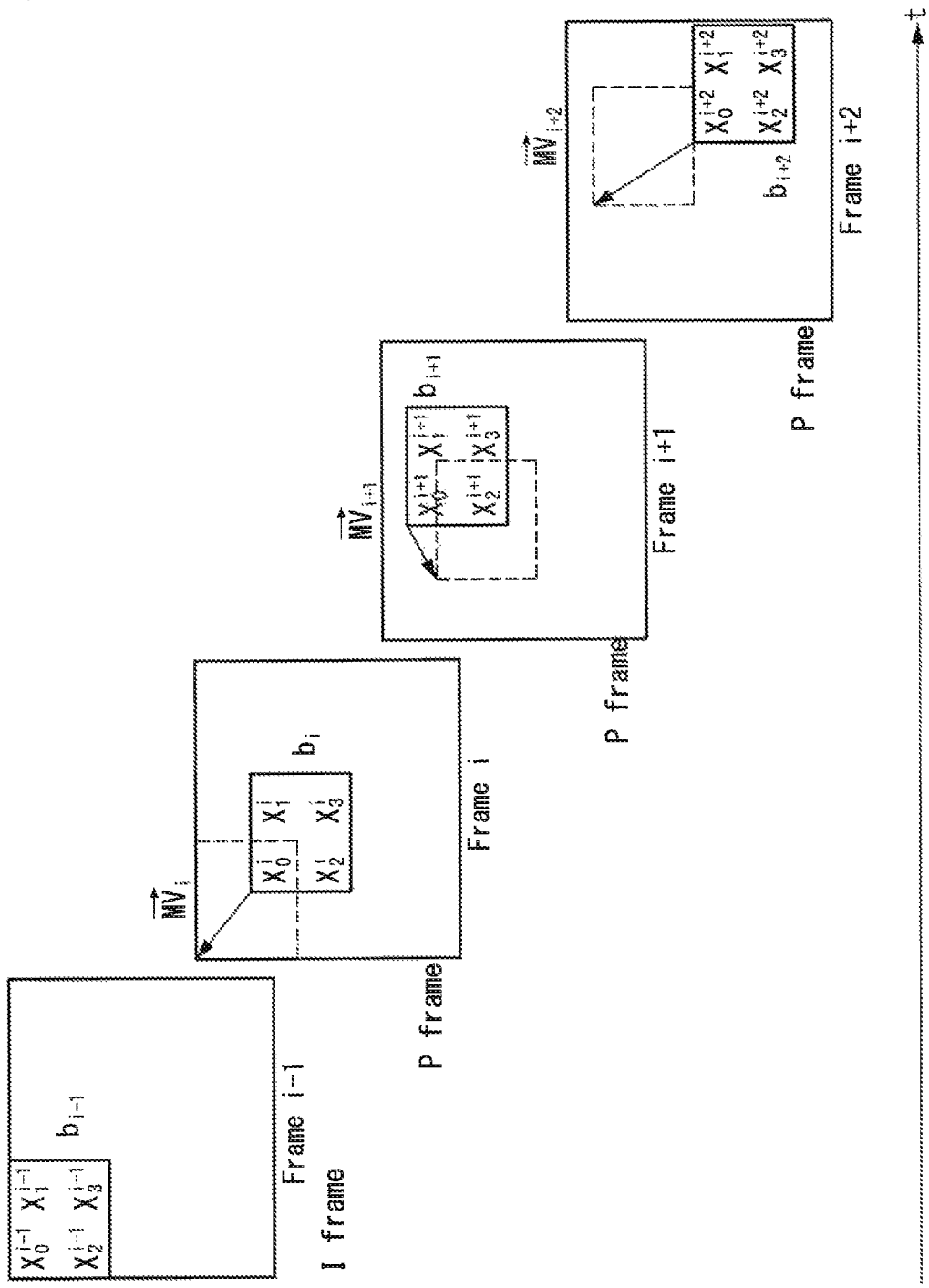
FIG. 11 shows intra-frame blocks forming a temporal trajectory of the same object in an IPPP type temporal prediction structure in accordance with an embodiment of the present invention.

FIG. 11 shows intra-frame blocks forming a temporal trajectory of the same object in an IPPP type temporal prediction structure in accordance with an embodiment of the present invention.

FIG. 11 shows a temporal prediction structure of typical IPPP type, Four frames from frame i−1 to frame i+2 are shown. The four frames may be I, P, P, and P frames respectively. The intra-frame blocks $b_{(i-1)} \sim b_{(i+2)}$ are connected by a motion vector to form a temporal trajectory in which a temporal motion of the same object may be identified. Although, for example, in FIG. 11, it is assumed that the intra-frame blocks $b_{(i-1)} \sim b_{(i+2)}$ are 2×2 blocks, the present invention is not limited thereto. In this case, a first order Gauss Markov model predictor may be defined as a following equation 13:

$$X_n^i = \rho X_n^{i-1} + Z_n \qquad \text{[equation 13]}$$

where $X_n^i$ denotes a pixel value at a n-th position in an i-th frame-intra block and a correlation coefficient $\rho$ is assumed to be 1.

However, since this model may not be valid, for example, due to motion vector inaccuracy, it may be more desirable to assume a following general model for the spatial correlation of spatial neighbors in the same frame:

$$X_n^i = \rho X_n^{i-1} + \sum_{k \in N_S} \sigma Y_k^i + Z_n \qquad \text{[equation 14]}$$

where $Y_k^i$ represents pixel values of spatially neighboring pixels, and $\sigma$ represents a correlation coefficient associated with $Y_k^i$.

In accordance with the present invention, the equation 13 or equation 14 may be used based on complexity or modeling accuracy.

Figure 12:
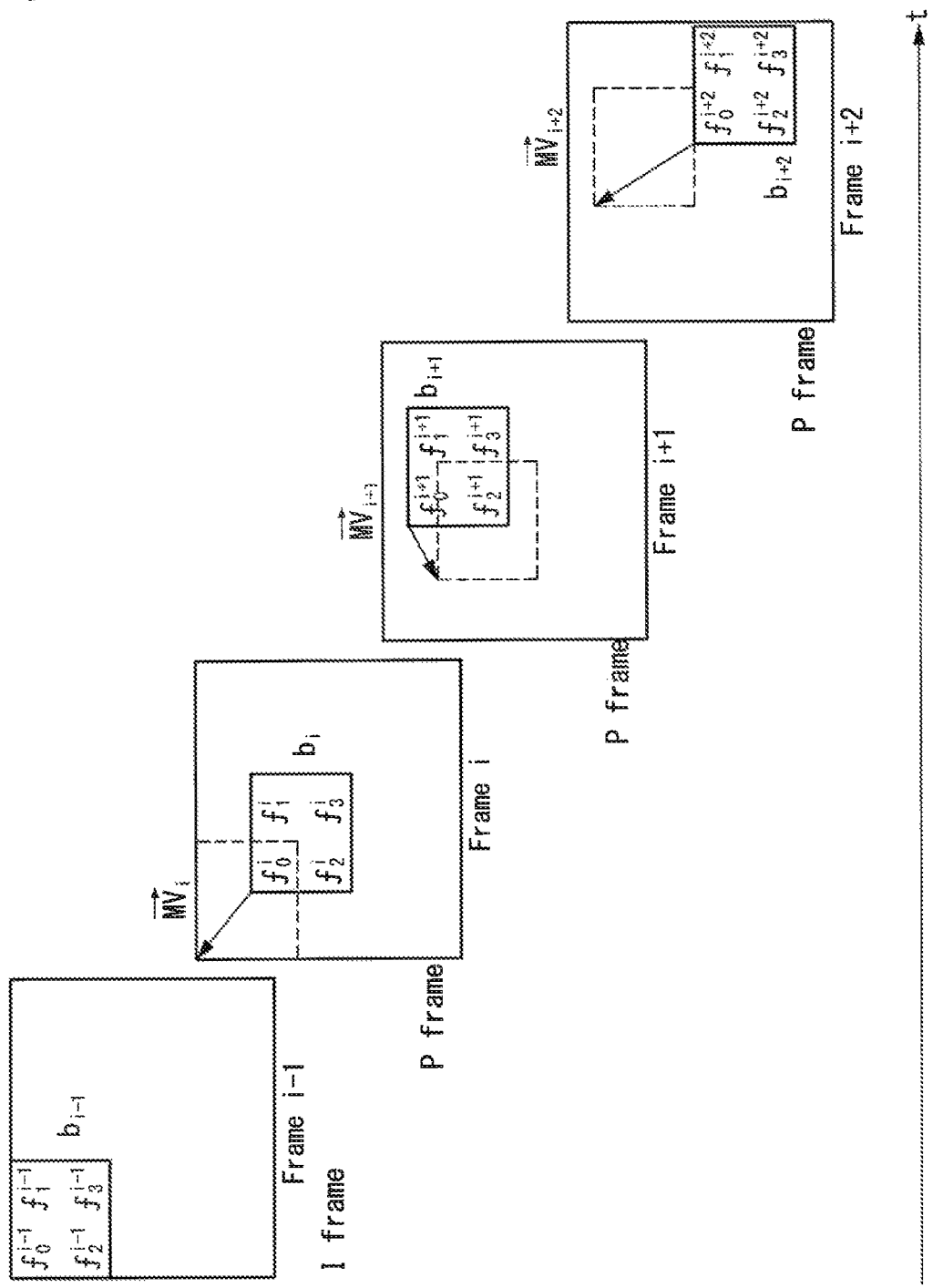
FIG. 12 shows intra-frame blocks for explaining application of prediction on a transform domain in a temporal prediction structure of an IPPP type in accordance with an embodiment of the present invention.
Figure 13:
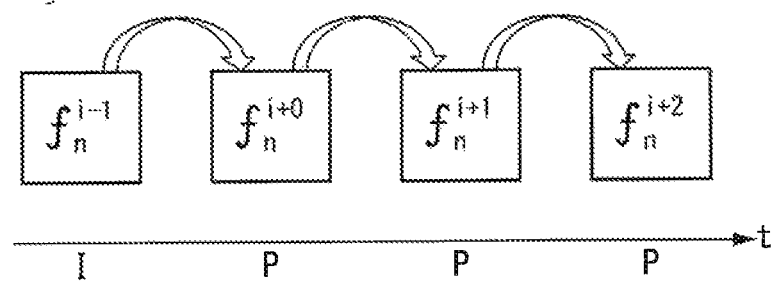
FIG. 13 shows a corresponding set of transform coefficients on which prediction on the transform domain is performed in the temporal prediction structure of the IPPP type.

FIG. 12 shows intra-frame blocks for explaining application of prediction on a transform domain in a temporal prediction structure of an IPPP type in accordance with an embodiment of the present invention. FIG. 13 shows a corresponding set of transform coefficients on which prediction on the transform domain is performed in the temporal prediction structure of the IPPP type.

Referring to FIG. 12, an intra-frame block may be divided into four sub-blocks. f denotes a transform coefficient for each sub-block. For example, the block bi in the frame i includes four sub-blocks. Each of $F_1$, $f_2$, $f_3$, and $f_4$ represents each transform coefficient for each of four sub-blocks, For example, referring to FIG. 12 to FIG. 13, it is assumed that the sub-blocks $b_{(i-1)}$ to $b_{(i+2)}$ are 2×2 blocks. However, the present invention is not limited thereto.

A correlation between the pixel value and the transform coefficient for the intra-frame block may be expressed as a following equation 15. The transform coefficients for each sub-block can be defined as a transform coefficient set:

$$F^i = TX^i \qquad \text{[equation 15]}$$

where $F^i$ denotes the transform coefficient set for the intra-frame block, $X^i$ denotes the pixel value set for the intra-frame block. T denotes the transform matrix.

In this case, $F^i$ and $X^i$ may be expressed as a following equation 16:

$$F^i = [f_0^i f_1^i f_2^i f_3^i]^T, \; X^i = [X_0^i X_1^i X_2^i X_3^i]^T. \qquad \text{[equation 16]}$$

The present invention provides a prediction method on the transform domain, so that the inter-pixel spatial correlation may be removed more greatly after the spatial transform. Thus, a first-order Gauss-Markov model, for example, expressed as a following equation 17 may enable the transform coefficient defined in the pixel domain to follow the temporal motion trajectory more effectively than in the equation 13:

$$f_n^i = \alpha_n^{i-1,i} f_n^{i-1} + Z_n \qquad \text{[equation 17]}$$

where n denotes an index of the transform coefficient, denotes a frame number, and $\alpha_n^{i-1,i}$ denotes a correlation coefficient between n-th transform coefficients for matching blocks in a (i-1)-th frame and a i-th frame.

Referring to FIG. 13, in the same manner as in the temporal prediction structure of the IPPP type, transform coefficient prediction may be performed on the transform domain. For example, a transform coefficient $f_n^f$ for the current i-th frame may be predicted from transform coefficient $f_n^{i-1}$ for the previous frame.

One of main ideas for the CNT algorithm in accordance with the present invention is that both prediction and transform may be applied one-dimensionally for improved decorrelation. Computational complexity may be significantly reduced by converting the three-dimensional spatiotemporal prediction as expressed as the above equation 14 with application of temporal directional prediction (TDP) to a one-dimensional temporal prediction as expressed as the above equation 17. The present invention provides a method for performing CNT on the spatiotemporal pixel volume without increasing the computational complexity.

In accordance with the present invention, the IPPP type CNT using the first Gauss-Markov model may be performed as follows Prediction dependence between the intra-frame transform coefficients may be defined as following equations 18 to 20:

$$\hat{f}_n^i = \alpha_n^{i-1} \tilde{f}_n^{i-1} \qquad \text{[equation 18]}$$

$$\hat{f}_n^{i+1} = \alpha_n^i \tilde{f}_n^i \qquad \text{[equation 19]}$$

$$\hat{f}_n^{i+2} = \alpha_n^{i+1} \tilde{f}_n^{i+1} \qquad \text{[equation 20]}$$

where $\hat{f}_n^i$ represents a prediction value of a n-th transform coefficient for a i-th intra-frame block, and $\tilde{f}_n^i$ represents a reconstructed sample for the n-th transform coefficient for the i-th intra-frame block, $\alpha_n^i$ denotes a correlation coefficient between n-th transform coefficients for corresponding blocks in a i-th frame and a (i+1)-th frame.

Based on the equations 18 to 20, an equation for predicting the transform coefficients for the intra-frame blocks may be defined as a following equation 21:

$$\hat{X} = F_0 \tilde{X} + GY$$

$$= \begin{bmatrix} 0 & 0 & 0 \\ \alpha_n^i & 0 & 0 \\ 0 & \alpha_n^{i+1} & 0 \end{bmatrix} \tilde{X} + \begin{bmatrix} \alpha_n^{i-1} \\ 0 \\ 0 \end{bmatrix} Y \qquad \text{[equation 21]}$$

where $\hat{X}$ denotes a set of prediction values of transform coefficients, $\tilde{X}$ denotes a reconstructed sample set for the transform coefficients, and Y denotes a transform coefficient for a previous frame. For example, $\hat{X}$ the set of prediction values, $\tilde{X}$ the reconstructed sample set and Y the transform coefficient for the previous frame may be expressed as following equations 22 to 24 respectively:

$$\hat{X} \equiv \begin{bmatrix} \hat{f}_n^i \\ \hat{f}_n^{i+1} \\ \hat{f}_n^{i+2} \end{bmatrix} \qquad \text{[equation 22]}$$

$$\tilde{X} \equiv \begin{bmatrix} \tilde{f}_n^i \\ \tilde{f}_n^{i+1} \\ \tilde{f}_n^{i+2} \end{bmatrix} \qquad \text{[equation 23]}$$

-continued $$Y \equiv f_n^{i-1} \quad \text{[equation 24]}$$

Furthermore, $\bar{X}=\hat{X}+\tilde{e}$. In this case, using an equation $\tilde{e}=T_T C$, a following equation 25 may be acquired as a reconstruction function:

$$\tilde{X}=(I-F_0)^{-1}T_T C+(I-F_0)^{-1}GY \quad \text{[equation 25]}$$

Upon comparing the equation 24 with the above-defined equation 6, $F\equiv(I-F_0)^{-1}$ and $H\equiv(I-F_0)^{-1}G$. Further, equation transform $T_T$ represents transform applied according to a temporal trajectory, which may include DCT, DST, and the like.

Thus, the CNT optimization equation to find out an optimal transform coefficient vector C* may be modified based on a following equation 26:

$$C^* = \underset{c_1 \in \Omega_1, \ldots, c_n \in \Omega_n}{\operatorname{argmin}} \{D(X - HY - FT_T C) + \lambda R(C)\} \quad \text{[equation 26]}$$

where D( ) denotes a distortion component, R( ) denotes a rate component, and λ denotes Lagrange multiplier. For example, D( ) represents a deductive function such as $l^2$ norm, and R( ) represents a bit measurement needed to transmit related additional information such as a quantization index corresponding to C*. λ represents a real number that maintains a balance between the distortion component and the rate component.

Figure 14:
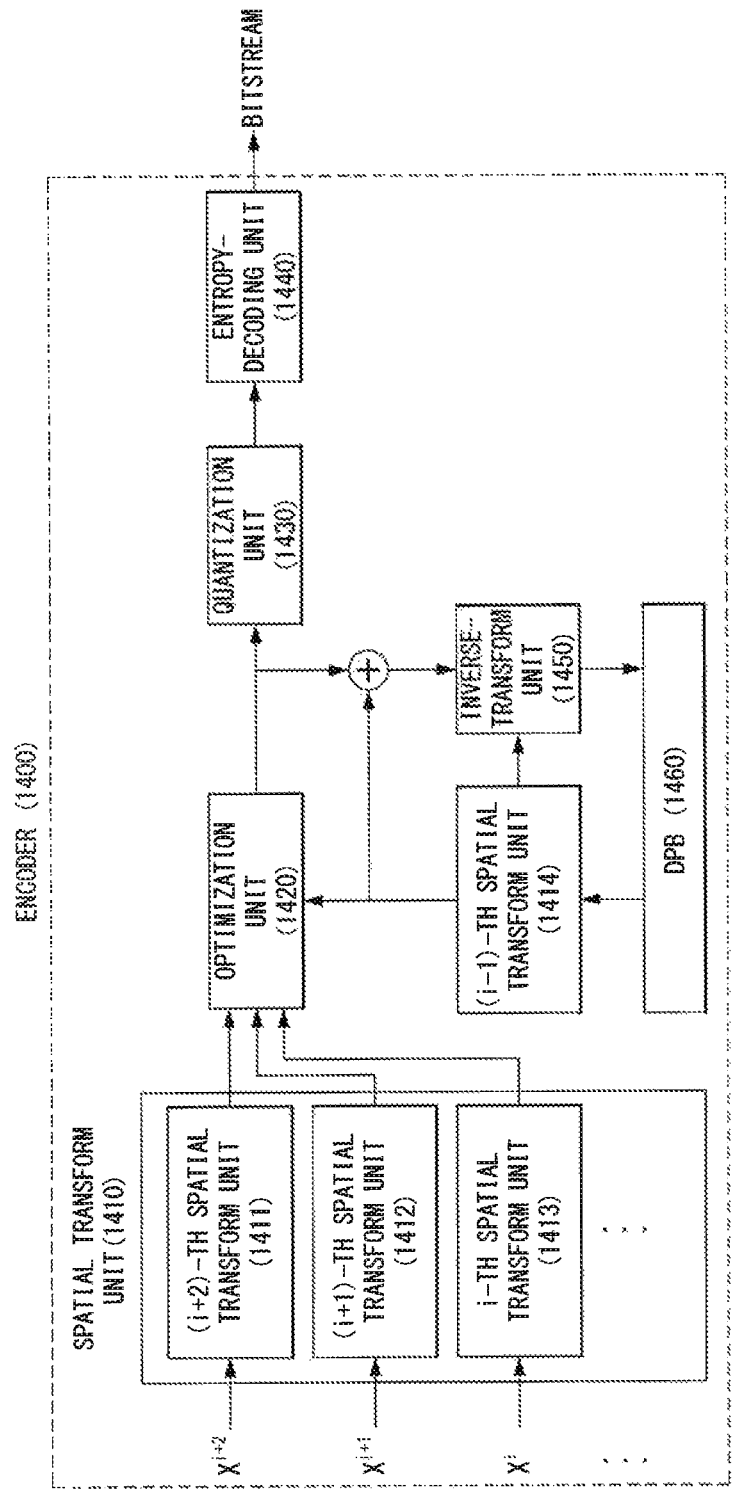
FIG. 14 and FIG. 15 are respective block diagrams of an encoder and a decoder for performing the IPPP type CNT according to embodiments of the present invention.
Figure 15:
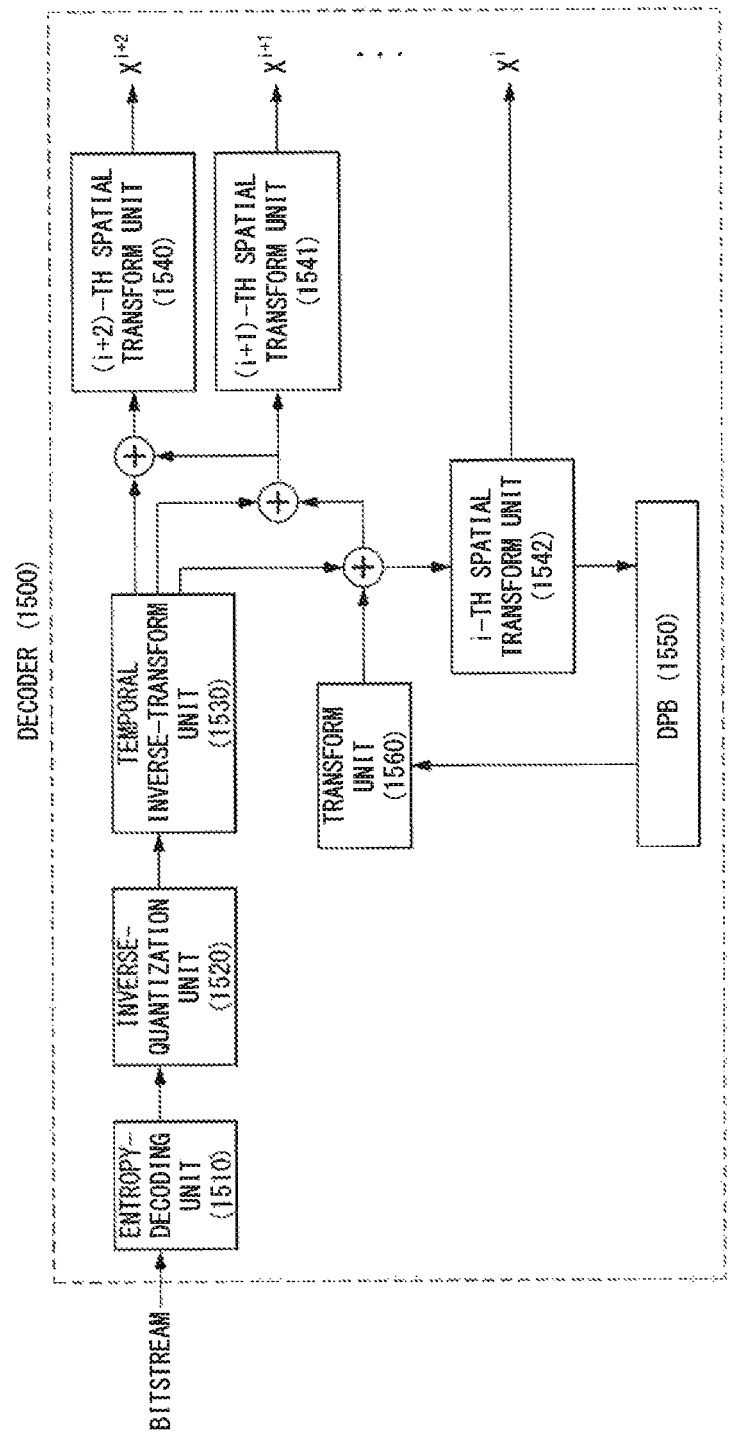

FIG. 14 and FIG. 15 are respective block diagrams of an encoder and a decoder for performing the IPPP type CNT according to embodiments of the present invention.

FIG. 14 shows a block diagram of an encoder and a decoder for performing an IPPP type CNT to which the present invention is applied.

Referring to FIG. 14, the encoder 1400 in accordance with the present invention may include a spatial transform unit 1410, an optimization unit 1420, a quantization unit 1430, an entropy-decoding unit 1440, an inverse-transform unit 1450, and DPB 1460. Further, the spatial transform unit 1410 may include a plurality of sub-spatial transform units, each applied to each frame. For example, the spatial transform unit 1410 includes a plurality of sub-spatial transform units including a (i+2)-th spatial transform unit, 1411, a (i+1)-th spatial transform unit 1412, a i-th spatial transform unit 1413, and so on. Alternatively, the (i−1)-th spatial transform unit 1414 may be configured separately as shown in FIG. 14, However, this is only for the sake of simple illustration. Actually, all of the sub-spatial transform units may be configured in a single spatial transform unit in the encoder.

The spatial transform unit 1410 receives a pixel value or a pixel value set on a pixel domain for each frame, and applies a spatial transform matrix thereto to output a transform coefficient or transform coefficient set. For example, the spatial transform unit 1410 may obtain a first transform coefficient by performing transform on a pixel value of a target block in a current frame.

The optimization unit 1420 may calculate the optimal transform coefficient using the optimization function. The optimization function includes a distortion component, a rate component and a Lagrange multiplier. In this case, for example, the equation 26 may be used. The optimal transform coefficient represents a transform coefficient that minimizes the optimization function.

In addition, the optimal transform coefficient may be obtained based on at least one of a transform coefficient prediction value, a reconstructed sample of the transform coefficient, and a correlation coefficient between the transform coefficients. For example, the optimization unit 1420 may reconstruct a second transform coefficient for a corresponding block in a previous frame, and obtain a prediction value of the first transform coefficient based on the reconstructed second transform coefficient and the correlation coefficient. In this case, the corresponding block in the previous frame refers to a block corresponding to a target block in a current frame. Further, the correlation coefficient represents the correlation between the reconstructed second transform coefficient and the first transform coefficient.

Although in FIG. 14, the inverse-transform unit 1450, the DPB 1460, the (i−1)-th spatial transform unit 1414 are shown as separate units, this is only for convenience of description. The inverse-transform unit 1450, the DPB 1460, the (i−1)-th spatial transform unit 1414 may be implemented in the optimization unit 1420.

Meanwhile, the optimal transform coefficient output from the optimization unit 1420 is quantized via the quantization unit 1430, and, then, is entropy-encoded via an entropy-encoding unit 1440, and, subsequently, is transmitted to a decoder.

Referring to FIG. 15, the decoder 1500 in accordance with the present invention may include an entropy-decoding unit 1510, an inverse-quantization unit 1520, a temporal inverse-transform unit 1530, a spatial inverse-transform unit (not shown), a DPB 1550, and a transform unit 1560. The spatial. inverse-transform unit (not shown) may include a (i+2)-th spatial inverse-transform unit 1540, a (i+1)-th spatial inverse transform unit 1541, and a i-th spatial transform unit 1542 and so on. The temporal inverse-transform unit 1530 and the spatial inverse-transform unit (not shown) are also configured separately in FIG. 15. This is only for convenience of explanation. The temporal inverse-transform unit 1530 and the spatial inverse-transform unit may be included in a single inverse-transform unit.

The entropy-decoding unit 1510 receives the optimal transform coefficient transmitted from the encoder 1400 and performs entropy decoding on the received coefficient.

The inverse-quantization unit 1520 de-quantizes the entropy-decoded transform coefficient, and the temporal inverse-transform unit 1530 outputs a transform coefficient or transform coefficient set for each frame. For example, a transform coefficient or transform coefficient set resulting from the transform being performed on the pixel value of the target block may be outputted.

The transform, coefficient output from the temporal inverse-transform unit 1530 may be transmitted to the spatial inverse-transform unit (not shown) together with a transform coefficient for the corresponding block in the previous frame. For example, the transform coefficient for the target block in a (i+2)-th frame may be transmitted to a (i+2)-th spatial inverse-transform unit 1540 together with the transform coefficient for the corresponding block in the previous frame.

The spatial inverse-transform unit (not shown) may perform a spatial inverse transform on the received transform coefficient to reconstruct the pixel value of the corresponding block. For example, a (i+2)-th spatial inverse-transform unit 1540 may reconstruct the pixel value $X^{i+2}$ of the target block in the (i+2)-th frame based on the transform coefficient output from the temporal inverse-transform unit 1530 and the transform coefficient for the corresponding block in the previous frame.

Meanwhile, the reconstructed pixel value of the target block in the i-th frame via the i-th spatial inverse-transform unit 1542 may be stored in the DPB 1550 and may be then used to reconstruct the pixel value of the intra-frame block.

Figure 16:
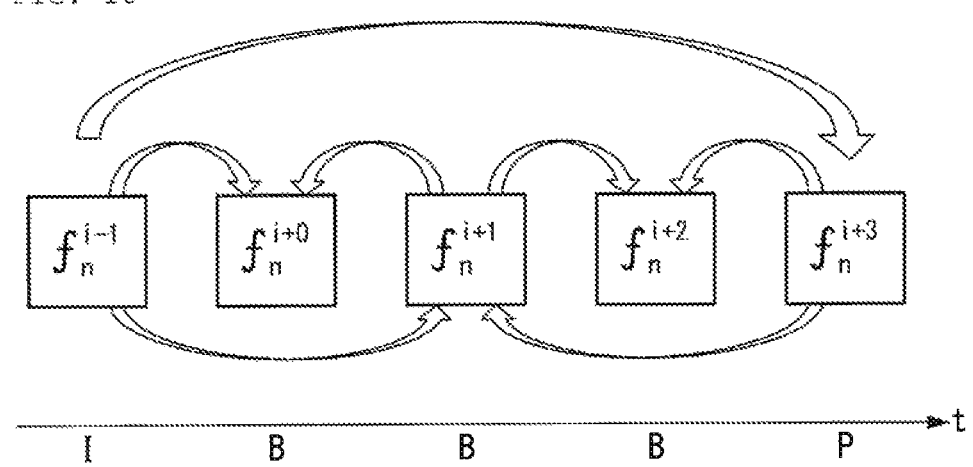
FIG. 16 shows a corresponding set of transform coefficients for which prediction on a transform domain is performed in a IBBBP type of a temporal prediction structure in accordance with one embodiment of the present invention.

FIG. 16 shows a corresponding set of transform. coefficients for which prediction on a transform domain is performed in a IBBBP type of a temporal prediction structure in accordance with one embodiment of the present invention.

Similarly to the equations 18 to 20 described above, the prediction dependence between the intra-frame transform coefficients may be defined by equations 27 to 30 as follows:

$$\hat{f}_n^i \equiv \alpha_n^{i-1,i} f_n^{i-1} + \alpha_n^{i+1,i} \tilde{f}_n^{i+1} \quad \text{[equation 27]}$$

$$\hat{f}_n^{i+1} \equiv \alpha_n^{i-1,i+1} f_n^{i-1} + \alpha_n^{i+3,i+1} \tilde{f}_n^{i+3} \quad \text{[equation 28]}$$

$$\hat{f}_n^{i+2} \equiv \alpha_n^{i+1,i+2} \tilde{f}_n^{i+1} + \alpha_n^{i+3,i+2} \tilde{f}_n^{i+3} \quad \text{[equation 29]}$$

$$\hat{f}_n^{i+3} \equiv \alpha_n^{i-1,i+3} f_n^{i-1} \quad \text{[equation 30]}$$

where $\hat{f}_n^i$ represents a prediction value of a n-th transform coefficient for a i-th intra-frame block, and $\tilde{f}_n^i$ represents reconstructed sample for the n-th transform coefficient for the i-th intra-frame block. $\alpha_n^i$ indicates a correlation coefficient between n-th transform coefficients for corresponding blocks in the i-th frame and the (i+1)-th. frame.

Based on the above equations 27 to 30, an equation for predicting the transform. coefficient for the intra-frame block may he calculated as a following equation 31:

$$\hat{X} = F_0 \tilde{X} + GY \quad \text{[equation 31]}$$

$$= \begin{bmatrix} 0 & \alpha_n^{i+1,i} & 0 & 0 \\ 0 & 0 & 0 & \alpha_n^{i+3,i+1} \\ 0 & \alpha_n^{i+1,i+2} & 0 & \alpha_n^{i+3,i+2} \\ 0 & 0 & 0 & 0 \end{bmatrix} \tilde{X} + \begin{bmatrix} \alpha_n^{i-1,i} \\ \alpha_n^{i-1,i+1} \\ 0 \\ \alpha_n^{i-1,i+3} \end{bmatrix} Y$$

where $\hat{X}$ denotes a set of prediction values of transform coefficients, $\tilde{X}$ denotes a reconstructed sample set for the transform coefficients, and Y denotes a transform coefficient for a previous frame, For example, $\hat{X}$ the set of prediction values, $\tilde{X}$ the reconstructed sample set and Y the transform coefficient for the previous frame may be expressed as following equations 32 to 34 respectively:

$$\hat{X} \equiv \begin{bmatrix} \hat{f}_n^i \\ \hat{f}_n^{i+1} \\ \hat{f}_n^{i+2} \\ \hat{f}_n^{i+3} \end{bmatrix} \quad \text{[equation 32]}$$

$$\tilde{X} \equiv \begin{bmatrix} \tilde{f}_n^i \\ \tilde{f}_n^{i+1} \\ \tilde{f}_n^{i+2} \\ \tilde{f}_n^{i+3} \end{bmatrix} \quad \text{[equation 33]}$$

$$Y \equiv f_n^{i-1}. \quad \text{[equation 34]}$$

Furthermore, $\overline{X} = \hat{X} + \tilde{e}$. In this case, using an equation $\tilde{e} \equiv T_T C$, the above defined equation 25 may be acquired as a reconstruction function:

$$\tilde{X} = (I - F_0)^{-1} T_T C + (I - F_0)^{-1} GY \quad \text{[equation 25]}.$$

In the IBBBP prediction structure, $F_0$ and G may be newly defined using the above the equation 31. Furthermore, the CNT optimization equation to find out an optimal transform coefficient vector C* may be modified based on the above equation 26.

The elements and operations of the present disclosure described above with reference with the specific temporal prediction structure are provided by way of example only. Thus, many other embodiments may be possible within the scope and ideal of the present invention.

Figure 17:
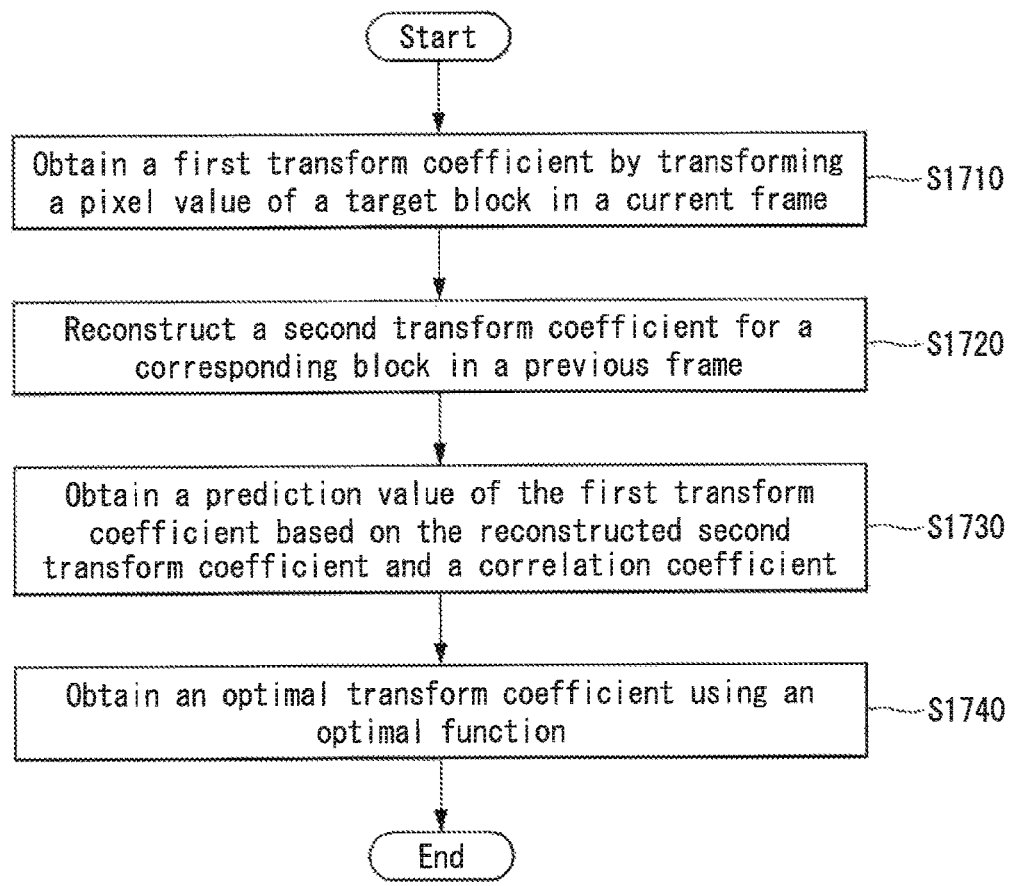
FIG. 17 is a flowchart illustrating a method of encoding a video signal based on pixel-correlations on a transform domain in accordance with an embodiment of the present invention.

FIG. 17 is a flowchart illustrating a method of encoding a video signal based on pixel-correlations on a transform domain in accordance with an embodiment of the present invention.

The present invention provides a method of encoding a video signal based on pixel-correlations on a transform domain.

First, a first transform coefficient may be obtained by performing a transform on pixel value of a target block in a current frame S1710.

Then, a second transform coefficient for a corresponding block in a previous frame may be reconstructed S1720. In this case, the corresponding block in the previous frame represents the block corresponding to the target block in the current frame.

Based on the reconstructed second transform coefficient and the correlation coefficient, a prediction value of the first transform coefficient may be obtained S1730. In this case, the correlation coefficient refers to the inter-pixel correlation between the reconstructed second transform coefficient and the first transform coefficient. Further, the correlation coefficient may vary based on the frequency index of the transform coefficients.

Meanwhile, the encoder may obtain an optimal transform coefficient using an optimal function S1740. In this case, the optimal function is based on the first transform coefficient and the second transform coefficient. The optimal transform coefficient represents a transform coefficient that minimizes the optimal function. For example, the optimal function may be expressed as the above equation 26.

Figure 18:
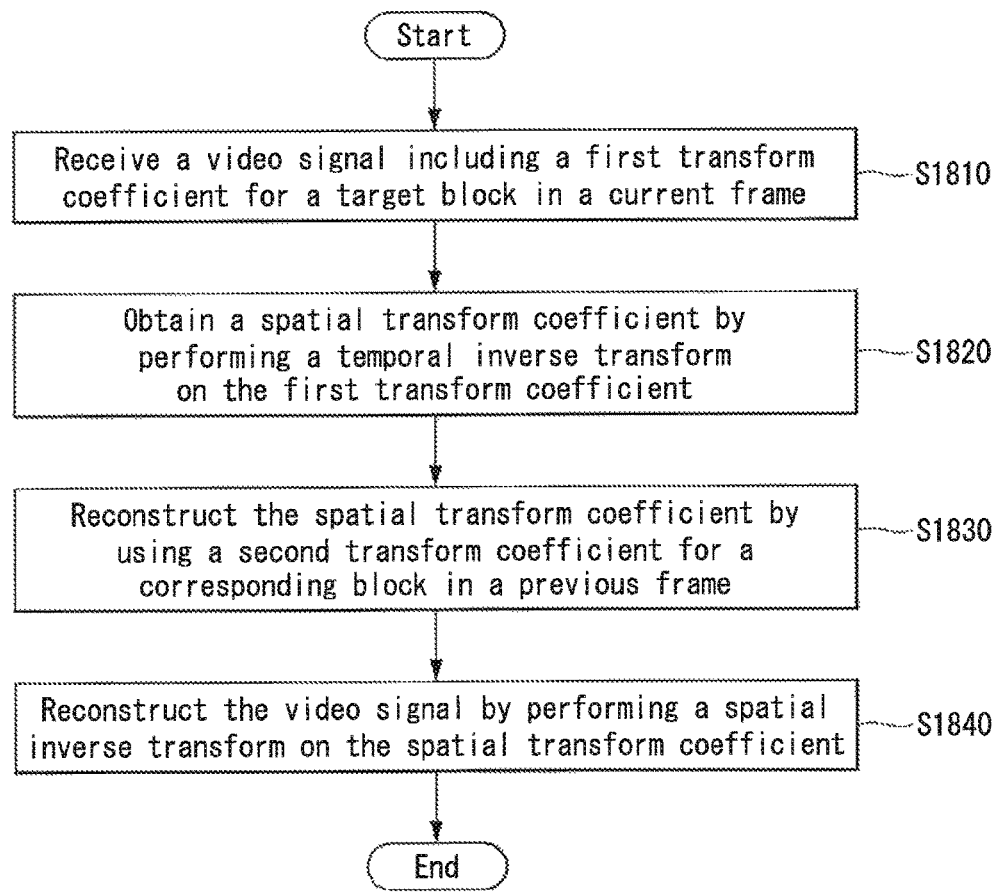
FIG. 18 shows a flow chart for decoding a video signal based on a conditionally nonlinear transform (CNT) considering pixel-correlations on a transform domain in accordance with an embodiment of the present invention.

FIG. 18 shows a flow chart for decoding a video signal based on a conditionally nonlinear transform (CNT) considering pixel-correlations on a transform domain in accordance with an embodiment of the present invention.

The present invention provides a method for decoding a video signal based on a conditionally nonlinear transform with taking into account pixel-correlations on a transform domain.

The decoder may receive a video signal including a first transform coefficient for a target block in a current frame S1810. In this case, the first transform coefficient represents a spatiotemporal transform coefficient obtained based on the optimal function.

The decoder may obtain a spatial transform coefficient by performing a temporal inverse transform on the first transform coefficient S1820. In this case, the temporal inverse transform represents an inverse transform applied based on a temporal trajectory. For example, the spatial transform coefficient may refer to a transform coefficient or a transform coefficient set resulting from the transform being performed on a pixel value of the target block.

The decoder may reconstruct the spatial transform coefficient by using the second transform coefficient for the corresponding block in the previous frame S1830.

The decoder can reconstruct the video signal by performing a spatial inverse transform on the spatial. transform coefficient S1840. For example, the pixel value of the target block in the current frame may be reconstructed based on the spatial transform coefficient and the transform coefficient for the corresponding block in the previous frame.

Meanwhile, the pixel value of the target block in the reconstructed current frame may be stored in the DPB and may be used to reconstruct the pixel value of the intra-frame block thereafter.

As described above, the embodiments explained in accordance with the present invention may be implemented and performed on a processor, a micro processor, controller or a chip. For example, functional units explained in FIGS. 1 to 4 and FIGS. 14 to 15 may be implemented and performed on a computer, a processor, a micro processor, a controller or a chip.

As described above, the decoder and the encoder to which the present invention is applied may be included in multimedia broadcasting transmission/reception apparatus, mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a hit stream generated by the encoding method may be stored in a computer-readable recording medium or may be transmitted over wired/wireless communication. networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method for encoding a video signal based on pixel-correlations on a transform domain, the method comprising:
obtaining a first transform coefficient by transforming a pixel value of a target block in a current frame;
reconstructing a second transform coefficient for a corresponding block in a previous frame; and
obtaining a prediction value of the first transform coefficient based on the reconstructed second transform coefficient and a correlation coefficient.

2. The method of claim 1,
wherein the second transform coefficient is reconstructed based, on all previously reconstructed transform coefficients and the first transform coefficient.

3. The method of claim 1,
wherein the correlation coefficient indicates a correlation between the reconstructed second transform coefficient and the first transform coefficient.

4. The method of claim 3,
wherein the correlation coefficient varies based on a frequency index of the transform coefficients.

5. The method of claim 1, further comprising:
obtaining an optimal transform coefficient using an optimal function,
wherein the optimal function is based on the first transform coefficient and the second transform coefficient,
wherein the optimal transform coefficient represents a minimum value of the optimal function.

6. The method of claim 1,
wherein the corresponding block in the previous frame corresponds to a block corresponding to the target block in the current frame.

7. A method for decoding a video signal, the method comprising:
receiving a video signal including a first transform coefficient for a target block in a current frame;
obtaining a spatial transform coefficient by performing a temporal is transform on the first transform coefficient, wherein the temporal inverse transform represents an inverse transform applied based on a temporal trajectory;
reconstructing the spatial transform coefficient by using a second transform coefficient for a corresponding block in a previous frame; and
reconstructing the Aden signal by performing a spatial inverse transform on the spatial transform coefficient.

8. The method of claim 7,
wherein the first transform coefficient represents a spatiotemporal transform coefficient obtained based on an optimal function.

9. A device for encoding a video signal based on pixel-correlations on a transform domain, the device comprising:
a spatial transform unit configured to obtain a first transform coefficient by transforming a pixel value of a target block in a current frame; and
an optimization unit configured to:
reconstruct a second transform coefficient for a corresponding block in a previous frame; and
obtain a prediction value of the first transform coefficient based on the reconstructed second transform coefficient and a correlation coefficient.

10. The device of claim 9,
wherein the correlation coefficient indicates a correlation between the reconstructed second transform. coefficient and the first transform coefficient.

11. The device of claim 10,
wherein the correlation coefficient varies based on a frequency index of the transform coefficients.

12. The device of claim 9,
wherein the optimization unit is further configured to obtain an optimal transform coefficient using an optimal function,
wherein the optimal function is based on the first transform coefficient and the second transform coefficient, and
wherein the optimal transform coefficient represents a minimum value of the optimal function.

13. The device of claim 9,
wherein the corresponding block in the previous frame corresponds to a block corresponding to the target block in the current frame.

14. A device for decoding a video signal, the device comprising:
- an entropy-decoding unit configured to receive a video signal including a first transform coefficient for a target block in a current frame; and
- an inverse-transform unit configured to
  - obtain a spatial transform coefficient by performing a temporal inverse transform on the first transform coefficient,
  - reconstruct the spatial transform coefficient by using a second transform coefficient for a corresponding block in a previous frame, and
  - reconstruct the video signal by performing a spatial inverse transform on the spatial transform coefficient,
  - wherein the temporal inverse transform represents an inverse transform applied based on a temporal trajectory.

15. The device of claim 14,
wherein the first transform coefficient represents a spatiotemporal transform coefficient obtained based on an optimal function.

* * * * *